UNITED STATES PATENT OFFICE.

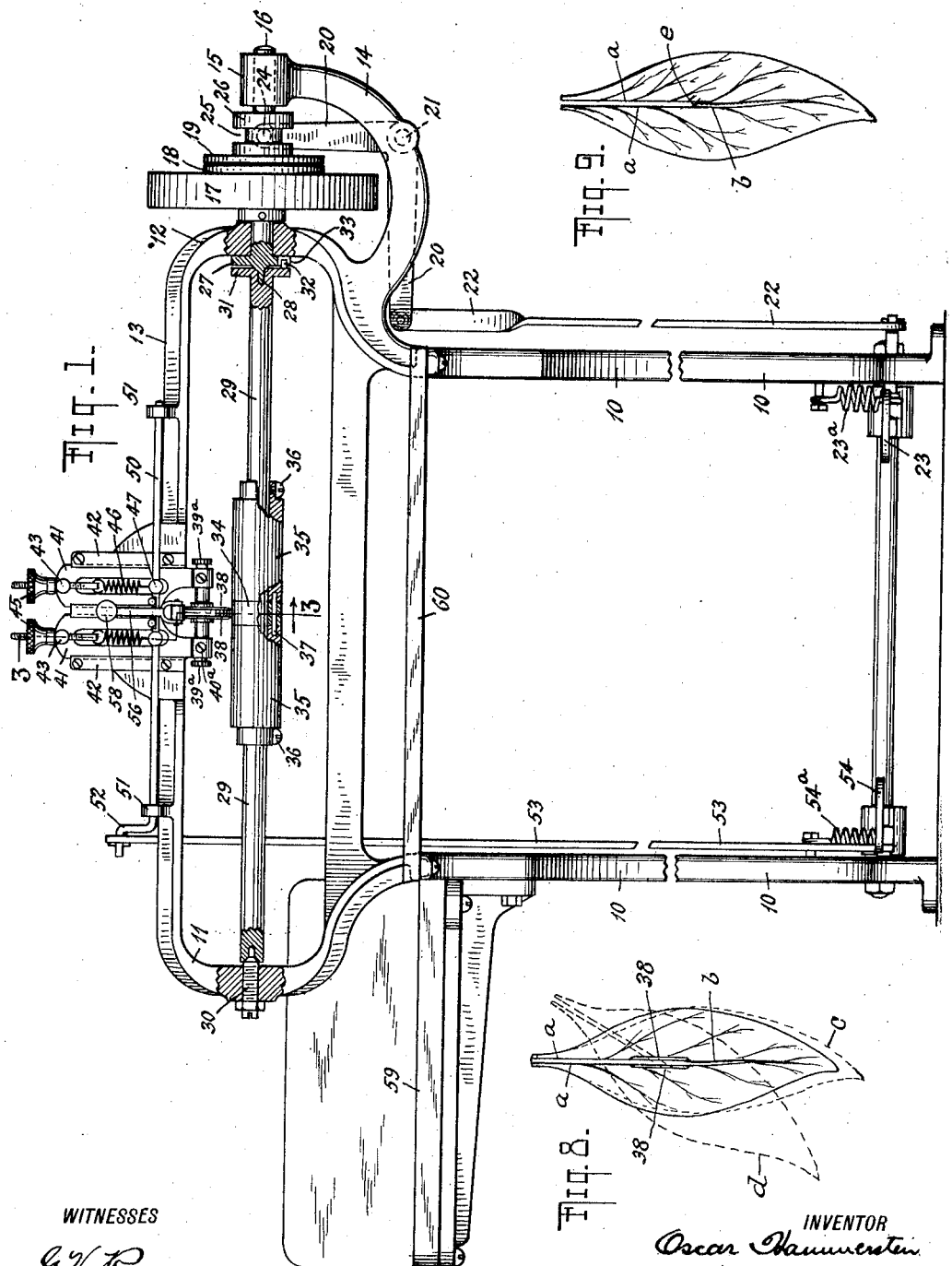

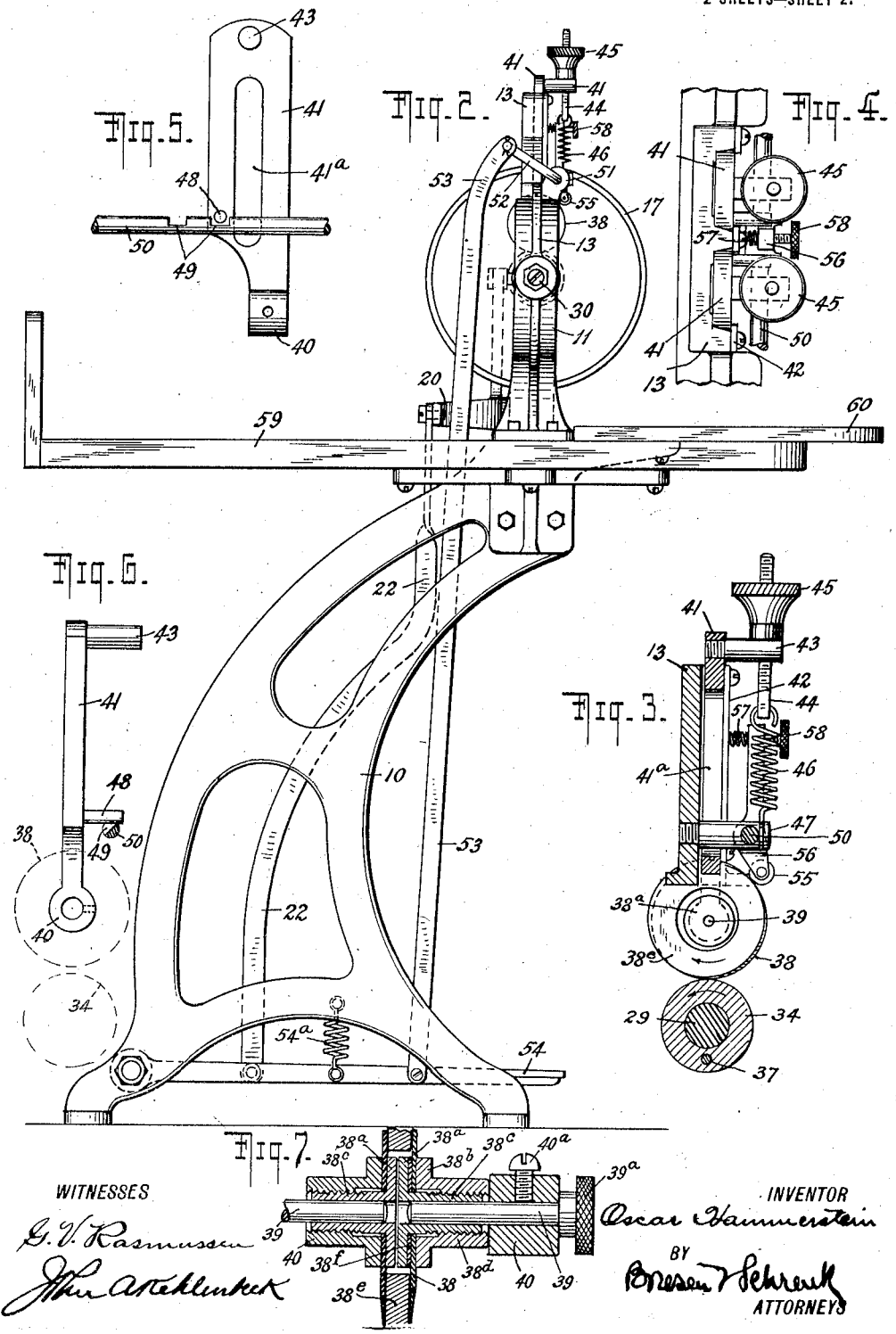

OSCAR HAMMERSTEIN, OF NEW YORK, N. Y.; EMMA SWIFT HAMMERSTEIN, EXECUTRIX OF SAID OSCAR HAMMERSTEIN, DECEASED, ASSIGNOR TO OSCAR HAMMERSTEIN'S TOBACCO STRIPPING MACHINE CO. INC., A CORPORATION OF NEW YORK.

PROCESS OF AND APPARATUS FOR STRIPPING TOBACCO-LEAF.

1,338,768.     Specification of Letters Patent.     Patented May 4, 1920.

Application filed March 19, 1919, Serial No. 283,501. Renewed December 6, 1919. Serial No. 343,108.

*To all whom it may concern:*

Be it known that I, OSCAR HAMMERSTEIN, a citizen of the United States, and resident of the borough of Manhattan, city, county, and State of New York, have invented certain new and useful Improvements in Processes of and Apparatus for Stripping Tobacco-Leaf, of which the following is a specification.

My invention relates to the stripping of tobacco leaf and has for its object to provide a simple and novel process whereby a section of the stem may be efficiently removed from the leaf without disturbing the remainder of said stem which, by reason of its being so thin as not to interfere with the proper burning of the subsequent cigar, and because of other physical characteristics, is to remain in the leaf. A further object of my invention is the provision of a simple apparatus whereby the process may be efficiently carried out. Other more specific objects of my invention will appear from the description hereinafter, and the features of novelty will be pointed out in the appended claims.

In the accompanying drawings, which for illustrative and descriptive purposes show an example of my apparatus, Figure 1 is a front elevation; Fig. 2 is an end elevation; Fig. 3 is a section on the line 3—3 of Fig. 1; Figs. 4, 5 and 6 are detail views; Fig. 7 is a detail view, partly in section, of the cutting means; Fig. 8 is a diagrammatic view illustrating the process, and Fig. 9 is a view of the leaf showing a section of the stem removed therefrom.

For the purpose of simplifying the matter, I will first describe my improved apparatus in order that the same may later on in the description, be utilized in describing my novel process, it being of course understood that the latter may be carried out in other ways and with the assistance of other instrumentalities.

As shown in the illustrated example, the apparatus comprises a stand or support 10 of suitable shape and construction and which includes end members 11 and 12 connected by means of a member 13, as shown in Fig. 1. The stand 10 is further provided with a bracket 14 having a bearing 15, in which one end of a power shaft 16 is journaled, the other end of said shaft 16 extending through and being rotatably mounted in the end member 12. A pulley 17 is loosely mounted on said shaft 16 and is driven in the usual manner by means of a suitable belt, said pulley carrying one member 18 of a clutch of any well known type. The coöperating member 19 of the clutch is keyed upon the shaft 16 so as to be rotatable therewith, and so as to be slidable lengthwise thereof. Any suitable means may be provided for moving the clutch member 19 into and out of engagement with the clutch member 18 to cause the pulley 17 to rotate said shaft 16, and to disconnect it therefrom. For instance, as shown a bell crank lever 20 may be pivoted at 21 upon the bracket 14 and have its one member connected by means of a link 22 with a suitable foot pedal 23, whereby the bell crank lever 20 is pivotally actuated. The other member of said bell crank lever 20 is provided with a pin 24 extending into the annular recess 25 of a collar 26 forming part of or secured to the clutch member 19. With this arrangement as the bell crank lever 20 is rocked on its pivot 21 through the medium of the link 22 and pedal 23, the clutch member 19 will be shifted into and out of engagement with the clutch member 18. A suitable spring 23ª may be provided for automatically returning the pedal 23 and its connected parts to normal position, thus automatically disengaging the clutch members 18 and 19 when pressure is removed from said pedal 23.

The inner end of the shaft 16 carries a disk 27 having a centering stud 28 upon which one end of a shaft 29 is centered, the other end of said shaft being similarly centered upon a centering screw 30 adjustably mounted in the end member 11. The shaft 29 carries a disk 31 located in proximity to the disk 27, and provided with a pin 32 arranged to extend into a recess 33 of said disk 27. With this arrangement, the two disks 27 and 31 are detachably coupled together and the shaft 29 is operatively connected with the power shaft 16. The shaft 29 further carries a roll 34, preferably of hardened steel or similar material and located between rolls 35 of brass or the like, the rolls 35 being secured upon the shaft 29 by screws 36 and connected with the roll 34 by means of a pin 37 as shown in Fig. 1.

The apparatus further includes a pair of circular cutting members or knives 38 spaced apart in parallel relation to each other in registry with the hardened roll 34 as shown in Fig. 1. The circular knives 38 are clamped between the flanges $38^a$ and $38^b$ forming part of or carried by sleeves $38^c$ and $38^d$, respectively; as shown in Fig. 7 the sleeve $38^c$ is externally screw-threaded and screws into the internally threaded sleeve $38^d$, this arrangement causing the flanges $38^a$ and $38^b$ to firmly clamp the knives 38 in position as the sleeves are screwed one into the other. In addition the sleeves $38^c$ are axially bored for the accommodation of pins 39 upon which the sleeves $38^c$ and $38^d$ and their connected parts, including the knives 38 are thus rotatably mounted. The pins 39 may be provided with heads $39^a$ and are slidably mounted in bearings 40 forming part of or carried by slides 41 and are fixed in their adjusted positions against lengthwise movements for instance, by set screws $40^a$. A washer $38^e$ is located between the knives 38 and is loosely mounted upon the opposed flanges $38^a$, the axial opening of said washer being of larger diameter than the diameters of said flanges, so as to permit said washer to play in directions transverse to the axes of the knives 38. The washer $38^e$ serves as a means for ejecting the stripped stem from between the knives and also prevents the latter from moving to any appreciable extent in axial directions. If for any reason it becomes necessary or desirable to adjust the distance between the knives 38, one or more washers $38^f$ may be located between one or both of the knives 38 and the contiguous flanges $38^a$.

The slides 41 are vertically movable in guideways 42, extending upwardly from the member 13, and are provided with lugs 43 through which loosely extend screw-threaded stems 44 upon which adjusting nuts 45 are located, the lugs 43 serving as bearings for said nuts. Coil springs 46 have their one end suitably connected with said stems 44 and their other ends secured to fixed studs 47, which extend through slots $41^a$ in the slides 41 and are secured upon the member 13, as shown in Fig. 3. With this arrangement the knives 38 are independently mounted and are capable of independently yielding in an upward direction when for any reason this becomes necessary. The tension of the springs 46 may be adjusted as required, by properly manipulating the nuts 45, as will be apparent.

The apparatus includes further a means whereby the cutting knives 38 may be moved out of coöperative relation with the roll 34. In the illustrated example, this means comprises pins 48 projecting outwardly from the slides 41 and normally extending into recesses 49 formed in a shaft 50 rotatably mounted in bearings 51 and extending through the studs 47. At one end the shaft 50 is provided with a crank 52, which is connected by means of a link 53 with a suitable pedal 54, whereby said shaft 50 is rocked in its bearings. The pedal 54 and its connected parts may be returned to normal position in any suitable manner as by means of a suitable spring $54^a$. Obviously as said shaft 50 is rocked by a depression of the pedal 54, the non-recessed portions of said shaft will act as cams and bear upwardly against the pins 48 and raise the same, thus lifting the slides 41 against the tension of the springs 46 and moving the cutting knives 38 away from the roll 34. A roller 55 is located in engagement with the peripheries of the knives 38 and is carried by an arm 56 journaled upon the shaft 50, said roller being pressed toward and maintained in engagement with the knives 38 by means of a spring 57, which bears with one end against one of the guideways 42 and has its other end in engagement with an adjusting screw 58 carried by the arm 56. The roller 55, among other things, serves to maintain the washer $38^a$ in a position eccentric to the knives 38 and somewhat to the rear, whereby the cut stem sections are positively ejected from between the knives at the proper time.

Suitably located shelves 59 and 60 may be provided in the apparatus for carrying the leaf before it has been stripped and for receiving it after the stripping operation has been performed.

In utilizing the apparatus, power is applied to rotate the pulley 17, which rotative motion is communicated to the shafts 16 and 29 by properly operating the clutch 18—19 and thus brings about a rotation of the rolls 34, 35. The tobacco leaf, properly spread out, is placed in the apparatus with the butt end of the stem between the knives 38 and is carried along by the rolls 34, 35. As the leaf is thus fed along, the knives 38 will be caused to rotate thereby, and will accordingly make a double cut along the stem which in this manner is cut cleanly from the leaf, the entire stem or only a section thereof being removed, as will be more fully described hereinafter, this being determined by the physical characteristics of each stem. During the stripping or cutting operation, each knife is held independently in yielding engagement with the leaf and is capable of yielding independently in response to any inequalities, or the like, which may exist in the leaf, or to adjust itself independently into proper relation to the roll 34. After the desired extent of stem has been cut from the leaf, the apparatus is temporarily stopped to permit the stripped leaf to be withdrawn therefrom and placed upon the shelf 60; if it is desired to have the stripped leaf pass through the apparatus, for instance, into a suitable receptacle or for the purpose of booking the leaf, the knives 28 may be raised from the roll 34 by depressing the pedal 54. The stem itself passes through the apparatus and simply drops from between the knives 38 or is forced from between the same by the washer 38ᵉ and falls to the floor or into a suitable receptacle.

I will now describe my novel process whereby it is possible to cut a predetermined section of stem from the leaf without interfering with or disturbing the remainder of said stem, which, because of its physical characteristics, may be permitted to remain as part of the leaf. In carrying out my novel process in conjunction with the apparatus hereinbefore described, the leaf is fed along by the roll 34—35, as above described, the knives 38 meanwhile making parallel cuts $a$ along opposite sides of the stem, as shown diagrammatically in Figs. 8 and 9. The cutting operation is continued until a predetermined point $b$, which, as shown in Fig. 8, is slightly beyond the terminating end of the stem section to be removed from the leaf, has been reached, whereupon the apparatus is temporarily stopped. The leaf is then drawn backward to a slight extent as indicated by the dotted position $c$ in Fig. 8, and shifted either to the right or left, for instance, as indicated by the dotted position $d$ in Fig. 8, so that the stem extends transversely across one of the cutters 38. The mechanism is then again started, whereupon the feed of the leaf will be continued and the one cutter 38 will transversely sever the stem as at $e$ into two sections, one of which, because of the cuts $a$, is removed from the leaf, and the other of which remains undisturbed in said leaf. My novel process thus consists in concurrently making two parallel cuts along the stem at opposite sides thereof, then drawing the leaf backward to a slight extent and then transversely cutting said stem at an intermediate point to positively cut a predetermined section of said stem from said leaf without disturbing the remainder of said stem which remains as a part of said leaf. As before stated, the stripped leaf may be withdrawn from the apparatus or permitted to travel therethrough at will.

My process is simple and efficient in operation and provides a method whereby waste of material as well as labor is avoided. The herein described apparatus is particularly adapted for carrying out my novel process, and in addition may be used to strip or cut the complete stem from the leaf.

Various changes in the specific form of apparatus shown and described, and in the specific form of process described, may be made within the scope of the claims, without departing from the spirit of my invention.

I claim:

1. The process of removing a section of the stem from tobacco leaf which consists in feeding a leaf forwardly in operative relation to cutting means and cutting lengthwise of the stem to a point intermediate of the length thereof, moving said leaf in its path of travel to a position at an angle to its direction of feed and with the leaf in said angular position cutting said stem transversely to remove said section of the stem from said tobacco leaf.

2. The process of removing a section of the stem from tobacco leaf which consists in feeding a leaf forwardly in operative relation to cutting means and coincidentally cutting along opposite sides of the stem to a point intermediate of the length of said stem, stopping the feed to said leaf, drawing said leaf back in a direction opposite to the feeding direction, moving said leaf in its path of travel to a position at an angle to its direction of feed and renewing the feed of said leaf while in said angular position whereby said stem is transversely cut at a point between the beginning and end of said first cuts.

3. An apparatus for stripping tobacco leaf comprising a feed roll, means for rotating said roll, a pair of cutting members mounted independently of each other in operative relation to said roll and a stem ejecting washer loosely mounted between said cutting members and capable of relative play in directions transverse to the axes of said cutting members.

4. An apparatus for stripping tobacco leaf comprising a feed roll, means for actuating said roll, a pair of cutting members mounted in operative relation to said roll and independently movable toward and away from the same and manually actuated means for concurrently lifting said cutting members away from said roll at will.

5. An apparatus for stripping tobacco leaf comprising a feed roll, means for actuating said roll, a pair of slides movable vertically independently of each other, cutting disks carried by each of said slides, said disks being located in spaced parallel relation to each other, springs connected with said slides whereby said cutting disks are maintained in operative relation to said roll, a rock shaft, coöperating means on said slides and rock-shaft whereby said slides are concurrently raised to move said cutting disks away from said roll and manually actuated means for operating said rock-shaft.

6. An apparatus for stripping tobacco leaf comprising a feed roll, means for actuating said roll, a pair of slides movable vertically independently of each other, cutting disks carried by said slides, said disks being located in spaced parallel relation to each other, and springs connected with said slides whereby said cutting disks are yieldingly maintained in operative relation to said roll.

7. An apparatus for stripping tobacco leaf comprising a feed roll, means for actuating said roll, a pair of slides movable vertically independently of each other, cutting disks carried by said slides, said disks being located in spaced parallel relation to each other, and means for adjusting said cutting disks toward and away from each other to vary the distance therebetween.

8. An apparatus for stripping tobacco leaf comprising a feed roll, means for actuating said roll, a cutting device located above and in coöperative relation to said roll, slidable means carrying said cutting device, resilient means connected with said slidable means whereby said cutting device is yieldingly maintained in operative relation to said roll, means for adjusting the tension of said resilient means and means for vertically actuating said slidable means to move said cutting device away from said roll.

9. In a tobacco leaf stemming machine, the combination of a feed roll with cutting means coöperating therewith to cut the leaf on opposite sides of the stem, and means to stop the cutting operation at any desired point to permit the leaf to be moved at an angle and to sever the stem on the resumption of the feed.

In testimony whereof I have hereunto set my hand.

OSCAR HAMMERSTEIN.